United States Patent

Dold

[11] Patent Number: 5,946,389
[45] Date of Patent: Aug. 31, 1999

[54] CABLING FOR BUILDINGS

[75] Inventor: Roland Dold, Furtwangen, Germany

[73] Assignee: BTR Blumberger Telefon-und Relaisbau Albert Metz, Germany

[21] Appl. No.: 08/888,733

[22] Filed: Jul. 7, 1997

[30] Foreign Application Priority Data

Jul. 11, 1996 [DE] Germany .......................... 196 27 944

[51] Int. Cl.⁶ .................................................. H04M 3/00
[52] U.S. Cl. ........................ 379/325; 379/326; 379/327; 379/332
[58] Field of Search .................................. 379/325, 326, 379/327, 332

[56] References Cited

U.S. PATENT DOCUMENTS 3,610,836 10/1971 Kimura et al. ......................... 379/325
3,869,582 3/1975 Humphrey et al. ..................... 379/325

Primary Examiner—Harry S. Hong
Assistant Examiner—Bing Bui
Attorney, Agent, or Firm—Eugene E. Renz, Jr.

[57] ABSTRACT

In buildings, structured cabling is frequently installed, in which outlet boxes are connected in a star-like pattern to a central distribution panel. So that a service-neutral cabling of this kind can be used for the connection of an ISDN bus, a bus panel is added to the distribution panel, and bridge adapters are inserted in the outlet boxes. The bus line is conducted from the bus panel over half of the wires of the cable to the outlet jacks and are returned via the bridge adapters and the other half of the wires of the cable back to the bus panel. In this way, the bus line can be looped in series from one outlet box to the next.

8 Claims, 2 Drawing Sheets

CABLING FOR BUILDINGS

The present invention relates to cabling for buildings, etc. The cage of the present invention is particularly adapted for use in commercial buildings, structured cablings, which lead from a central distribution panel.

In commercial buildings, structured cablings, which lead from a central distribution panel (patch field/patch panel) in a star-like configuration to outlet boxes distributed throughout the building or one floor of the building are being used to an increasing extent. These cablings are usually designed fro data networks and meet, for example, the category 5 standard for data transmissions of up to 100 megabits.

Structured cabling is designed in a service-neutral manner, where each plug-in type connection of the distribution panel is connected to an outlet box. The individual outlet boxes can thus be connected and reconnected individually to the distribution panel. As a rule, both the plug-in connections and the outlet boxes have 8 poles and are thus connected to each other by 8-wire cables.

This known cabling, in which the individual outlet boxes are connected to the distribution panel in a star-like configuration, is not suitable for connecting the outlet boxes to a bus line. If, for example, terminals are to be connected to a telecommunications hookup, the outlet boxes cannot be used. Either new cabling must be laid, or the existing service-neutral cabling must be reconnected. Both alternatives are associated with considerable expense.

The invention is based on the task of making use, in a simple and reversible manner, of an existing cabling with outlet boxes connected to a distribution panel in a star-like configuration for the connection of the outlet boxes to a bus line.

This task is accomplished according to the invention on the basis of the features of the characterizing clause of claim 1.

Advantageous embodiments and elaborations of the invention are stated in the subclaims.

The invention creates the possibility, in an existing cabling with outlet boxes connected to a distribution panel in a star-like configuration, of looping a bus line in series from one outlet box to the next, without the need for any interventions in, or modifications to, the existing cabling. The only condition is that the number of wires in the bus line may not be more than half them number of wires in the cabling of the distribution panel with outlet boxes or more than half the number of occupied poles of the outlet boxes.

A bus panel, which has a input terminal for the bus line and several output terminals, is associated with the distribution panel. The output terminals have the same number of poles as the plug-in connections of the distribution panel and the outlet boxes. The output terminals of the bus panel are connected to the plug-in connections of the distribution panel. Because the output terminals of the bus panel and the cabling of the distribution panel and the outlet boxes have at least twice the number of poles or wires as the bus line, the bus line is connected to the corresponding poles of each outlet boxes via a group of poles of the output terminals and the associated group of wires in the cables of the existing cabling. A bridge adapter, which connected these poles to the other group of poles, is plugged into each outlet box, so that the buses line is returned in each case by way of the other group of wires of the cable back to the associated plug-in connection of the distribution panel and the associated output terminal of the bus panel. The output terminals of the bus panel are interconnected in such a way that the bus line which has been brought back to the output terminal leads onward to the feed poles of the next output terminal and is looped through it to the next outlet box.

In order to connect the 8-pole outlet boxes of an existing cabling, connected in a star-like configuration, so that they can be connected to a bus line, e.g., to a four-wire ISDN-So bus, the only step required is therefore to add the bus panel to the distribution panel and to plug the bridge adapters into the outlet boxes. The bus panel is advisably connected via a plug-in cable to the distribution panel, so that the upgrade can be reversed without difficulty.

It is also advisable for the bridge adapters to be equipped in addition with at least one jack, which is connected to the poles of the bus line, so that the bridge adapter simultaneously forms a socket into which the data terminal can be plugged.

To increase its versatility, the bus panel can also be equipped with two input terminals, so that it can be used with various types of telecommunications networks. For example, the first input terminal can be designed as a RJ45 jack for connection to an ISDN network, and the second input terminal can be designed as a TAE jack for connection to an analog network.

The invention is explained in greater detail below on the basis of an exemplary embodiment illustrated in the drawing.

Figure 1:
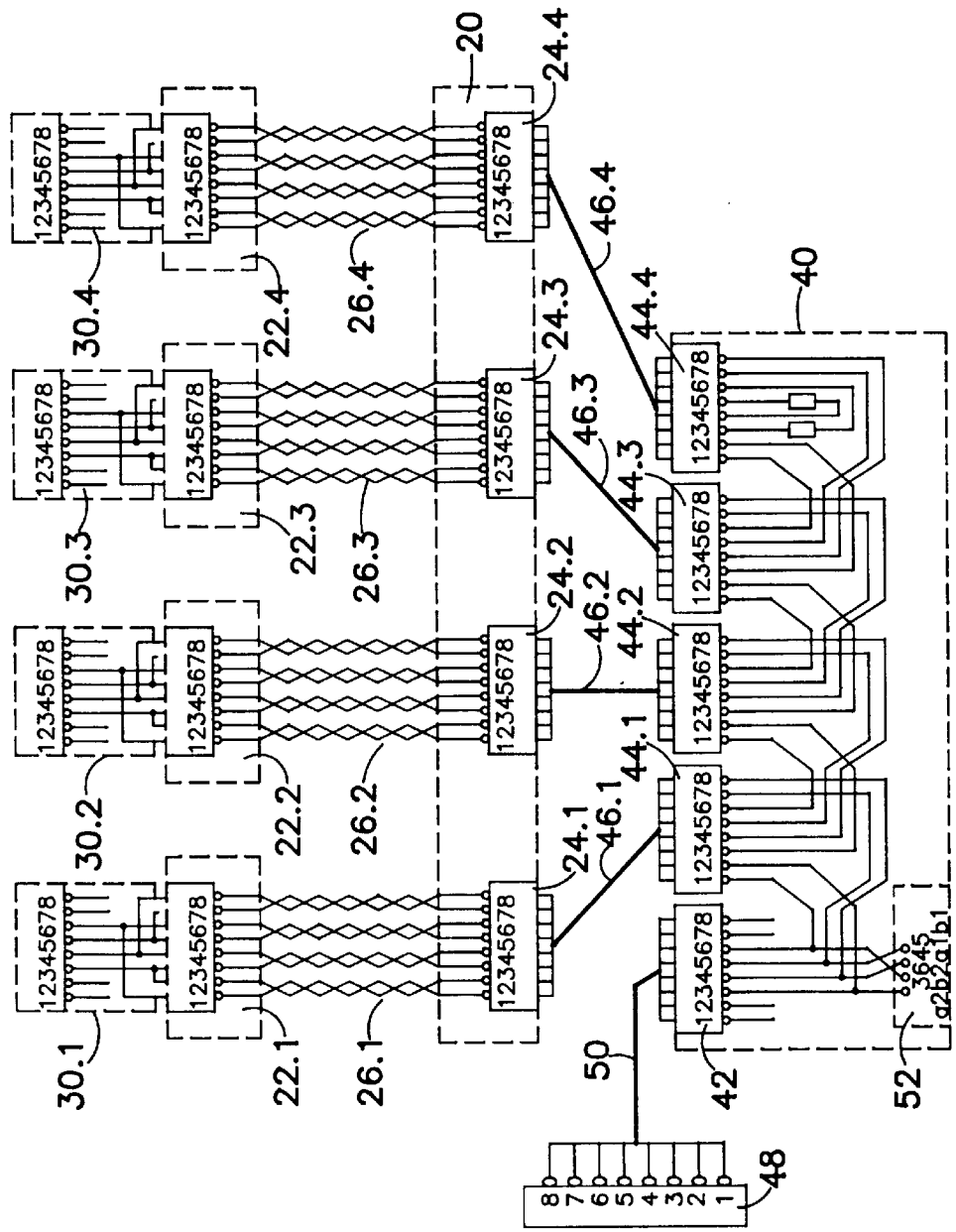
FIG. 1 is a schematic diagram of a cabling which has bene upgraded for connection to a bus line.

A conventional, service-neutral, structured cabling preferably shielded and meeting the category 5 stand, is laid in a building. The cabling has a central distribution panel 20 and several decentralized outlet boxes 22.1, 22.2, 22.3, 22.4. Each outlet box 22.1, 22.2, 22.3, 22.4 is associated with a plug-in type connection 24.1, 24.2, 24.3, 24.4 of distribution panel 20. Outlet boxes 22.1, 22.2, 22.3, 22.4 are connected by cables 26.1, 26.2, 26.3, 26.4 to the associated plug-in connections 24.1, 24.2, 24.3, 2.4.

Outlet boxes 22.1, 22.2, 22.3, 22.4 are designed as shielded UAE boxes with an RJ45 plug, all 8 poles of which are provided with contracts. In a corresponding manner, plug-in connections 24.1, 24.2, 24.3, 24.4 are designed as RJ45 jacks, the 8 poles of which are also provided with contacts. Cables 26.1, 26.2, 26.3, 26.4 are 8-wire cables, which connect the 8 occupied poles of outlet boxes 22 to the 8 occupied poles of plug-in connections 24 in a 1:1 manner.

To make this conventional cabling usable for connection to a bus line, a bridge adapter 30.1, 30.2, 30.3, 30.4 is assigned to each outlet box 22.1, 22.2, 22.3, 22.4. A bus panel 40 is added to distribution panel 20.

Bus panel 40 is preferably provided with a front access field in the same way as distribution panel 20 and can be installed text to distribution panel 20 in a standard cabinet.

Bus panel 40 has an input terminal 42, which is designed as an RJ45 jack. Of the 8 poles of this jack, only poles 3, 4, 5, 6 are provided with contacts. In addition, bus panel 40 also has four output terminals 44.1, 44.2, 44.3, 44.4, which are also designed as RJ45 jacks, all 8 poles of which are provided with contacts. By way of a printed circuit board mounted in bus panel 40, occupied poles 3, 4, 5, 6 of input terminal 42 are connected to poles 1, 2, 7, 8 of first output terminal 44.1. Output terminals 44.1, 44.2, 44.3, 44.4 are each connected to each other in such a way that pole 3, 4, 5, 6 of each output terminal are connected to poles 1, 2, 7, 8 of the follow output terminal. Pole 3 and 6 as well as poles 4 and 5 of the last output terminal 44.4 are connected to each other by 100-ohm terminating resistors.

Output terminals 44.1, 44.2, 44.3, 44.4 are each connected by way of 8-wire, 100-ohm cables 46.1, 46.2, 46.3, 46.4 to plug-in connections 24.1, 24.2, 24.3, 24.4 of distribution panel 20.

Bus panel 40 is connected to an outlet box 48 of a telecommunications network. Outlet box 48, installed by the operator of the telecommunications network has, for example, an RJ45 jack, poles 3, 4, 5, 6 of which carry the signals of an ISDN connection. Outlet box 48 is connected to input terminal 42 of bus panel 40 by means of a plug-in cable 50.

Bus panel 40 can also have a second input terminal 52, which is designed as a threaded terminal end or an IDC (insulation displacement contact) terminal (LSA-Plus), so that bus panel 40 can also be connected by means of an installation cable (e.g., wire gauge 0.4–0.63 mm) directly to an ISDN connection. The four poles of input terminal 52 are connected in parallel to the occupied poles 3, 4, 5, 6 of input terminal 42.

Figure 2:
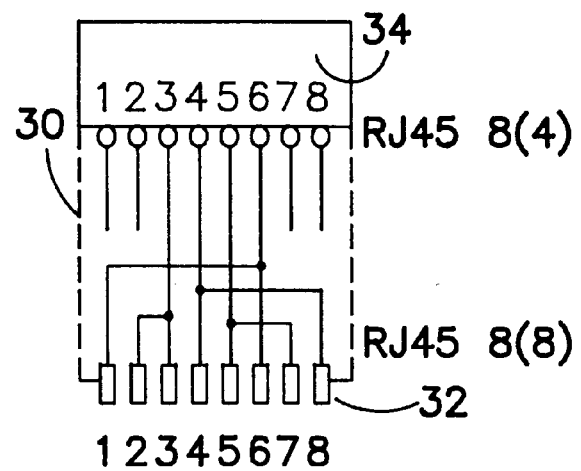
FIG. 2 is a schematic diagram of a bridge adapter with a jack.
Figure 3:
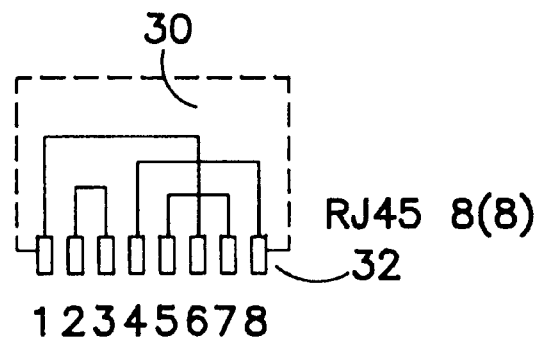
FIG. 3 is a schematic diagram of a bridge adapter without a jack.

FIGS. 2 and 3 show two designs of bridge adapters 30. Bridge adapters 30 have a housing, in which an RJ45 plug 32 is provided, by means of which bridge adapter 30 can be plugged into the associated outlet box 22. All poles of plug 32 are occupied. Pole 1 is connected to pole 6, pole 2 to pole 3, pole 7 to pole 5, and pole 8 to pole 4 by means of a printed circuit board installed in the housing.

In the design according to FIG. 2, an RJ45 jack 34 is also installed in the housing of bridge adapter 30. Of its 8 poles, only poles 3, 4, 5, 6 are occupied and are connected to the corresponding poles of plug 32. In the design according to FIG. 3, the adapter has only plug 32.

The four-wire So bus of the ISDN connection extends from poles 3, 4, 5, 6 of outlet box 48 via cable 50 to poles 3, 4, 5, 6 of input terminal 42. From poles 3, 4, 5, 6 of input terminal 42, the bus continues to poles 1, 2, 7, 8 of first output terminal 44.1. Via cable 46.1, the bus extends to poles 1, 2, 7, 8 of plug-in connection 24.1 and via cable 26.1 to poles 1, 2, 7, 8 of outlet box 22.1. From these poles 1, 2, 7, 8 of outlet box 22.1, the bus continues via bridge adapter 30.1 to poles 3, 4, 5, 6 of outlet box 22.1 and passes back via cable 26.1 and poles 3, 4, 5, 6 of plug-in connection 24.1 of distribution panel 20. Via cable 46.1, the bus continues to poles 3, 4, 5, 6 of outlet terminal 44.1. From these poles, the bus continues to poles 1, 2, 7, 8 of the second output terminal 44.2 and is then looped in the same way as before through outlet boxes 22.2, 22.3 and 22.4. The bus lines are terminated by ohmic resistors at poles 3, 4, 5, 6 of the last output terminal 44.4.

A data terminal can be connected to the bus line by way of jack 34 on each bridge adapter 30. If one of outlet boxes 22,1, 22.2, 22.3, 22.4 is not needed, it is sufficient merely to plug a bridge adapter 30 designed according to FIG. 3 into this outlet box in order to loop the bus line around this outlet box.

In a corresponding manner, an analog telecommunications hookup can be connected via input terminal 52 to outlet 22.

It is obvious without further explanation that the invention is not limited to the number of outlet boxes 22 and plug-in connections 24 shown. The invention is also applicable to systems with a different number of wires and in conjunction with other types of plug-in connection systems.

| | |
|---|---|
| 20 | distribution panel |
| 22, 22.1, 22.2, 22.3, 22.4 | outlet boxes |
| 24, 24.1, 24.2, 24.3, 24.4 | plug-in connections |
| 26, 26.1, 26.2, 24.3, 26.4 | cables |
| 30, 30.1, 30.2, 30.3, 30.4 | bridge adapters |
| 32 | plug |
| 34 | jack |
| 40 | bus panel |
| 42 | input terminal |
| 44, 44.1, 44.2, 44.3, 44.4 | output terminals |
| 46, 46.1, 46.2, 46.3, 46.4 | cables |
| 48 | outlet box |
| 50 | cable |
| 52 | input terminal |

What is claimed:

1. Cabling for buildings, etc., with at least one distribution panel (20), which has several plug-in connections (24.1, 24.2, 24.3, 24.4); with outlet boxes (22.1, 22.2, 22.3, 22.4); and with cables (26.1, 26.2, 26.3, 26.4), which connect the plug-in connections (24.1, 24.2, 24.3, 24.4) of the distribution panel (20) to the outlet boxes (22.1, 22.2, 22.3, 22.4), where the plug-in connections (24.1, 24.2, 24.3, 24.4) and the outlet boxes (22.1, 22.2, 22.3, 22.4) are designed with multiple poles and are connected by the cables (26.1, 26.2, 26.3, 26.4), which have to corresponding number of wires, characterized in that, to connect a bus line with no more than half the number of wires to the outlet boxes (22.1, 22.2, 22.3, 22.4), a bus panel (40) with an input terminal (42; 52) and several output terminals (44.1,44.2, 44.3, 44.4) is added to the distribution panel (20); in that bridge adapters (30.1, 30.2, 30.3, 30.4) are added to the outlet boxes (22.1, 22.2, 22.3, 22.4); in that the bus line can be connected to the input terminal (42; 52) of the bus panel (40); in that the output terminals (44.1, 44.2, 44.3, 44.4) of the bus panel (40) have the same number of poles as the plug-in connections (24.1, 24.2, 24.3, 24.4) of the distribution panel (20) and can be connected to them; in that the bus line extends in the bus panel (40) from the input terminal (42; 52) to the first output terminal (44.1) in that the output terminals (44.1, 44.2, 44.3, 44.4) have a number of feed poles (1, 2, 7, 8) and of onward-leading poles (3, 4, 5, 6) corresponding to the number of wires of the bus line, where each onward-leading pole (3, 4, 5, 6) of each output terminal (44.1, 44.2, 44.3) in the bus panel (40) is connected to a feed pole (1, 2, 7, 8) of the following output terminal (44.1, 44.2, 44.3) and in that the bridge adapters (30.1, 30.2, 30.3, 30.4) plugged into the outlet boxes (22.1, 22.2, 22.3, 22.4) connect the poles (1, 2, 7, 8) of the outlet box (22.1, 22.2, 22.3, 22.4) connected via the distribution panel (20) and the cables (26.1, 26.2, 26.3, 26.4) to the feed poles (1, 2, 7, 8) of the output terminals (44.1, 44.2a, 44.3, 44.4) to the poles (3, 4, 5, 6) of the outlet boxes (22.1, 22.2, 22.3, 22.4) connected to the onward-leading poles (3, 4, 5, 6) of the output terminals (44.1, 44.2, 44.3, 44.4).

2. Cabling according to claim 1, characterized in that the outlet boxes (22.1, 22.2, 22.3, 22.4) the plug-in connections (24.1, 24.2, 24.3, 24.4), and the output terminals (44.1, 44.2, 44.3, 44.4) are each designed with 8 poles, and in that the bus line is designed with 4 wires.

3. Cabling according to claim 2, characterized in that the outlet boxes (22.1, 22.2, 22.3, 22.4) the plug-in connections (24.1, 24.2, 24.3, 24.4) and the output terminals (44.1, 44.2, 44.3, 44.4) all have 8-pole RJ45 jacks.

4. Cabling according to claim 3, characterized in that the input terminal (42) of the bus panel has an 8-pole RJ45 jack, in which only four poles (3, 4, 5, 6) are occupied, these poles being connected to the first output terminals (44.1).

5. Cabling according to one of the preceding claims, characterized in that the bus panel (40) has one input terminal (42) for connection to the digital telecommunications network via an RJ45 plug connection and also a threaded terminal end or insulation displacement contact terminal connection and in that the two input terminals (42; 52) are connected in parallel to the feed poles (1, 2, 7, 8) of the first output terminal (44.1).

6. Cabling according to one of the preceding claims, characterized in that at least some of the bridge adapters (30.1, 30.2, 30.3, 30.4) have at least one jack (34), the poles (3, 4, 5, 6) of which are connected to the interconnected poles (2, 3; 4, 8; 5,7; 1,6).

7. Cabling according to claims 3 and 6, characterized in that the each bridge adapter (30.1, 30.2, 30.3, 30.4) has an 8-pole RJ45 plug (32), the 8 poles of which are occupied, and in that at least some of the adapters have at least one 8-pole RJ45 jack (34), only 4 poles (3, 4, 5, 6) of which are occupied.

8. Cabling according to claim 3, characterized in that 8-wire cables (46.1, 46.2, 46.3, 46.4), each of which has two 8-pole RJ45 plugs, are provided for connecting the output terminals (44.1, 44.2, 44.3, 44.4) of the bus panel (40) to the plug-in connections (24.1, 24.2, 24.3, 24.4) of the distribution panel (20).

* * * * *